UNITED STATES PATENT OFFICE.

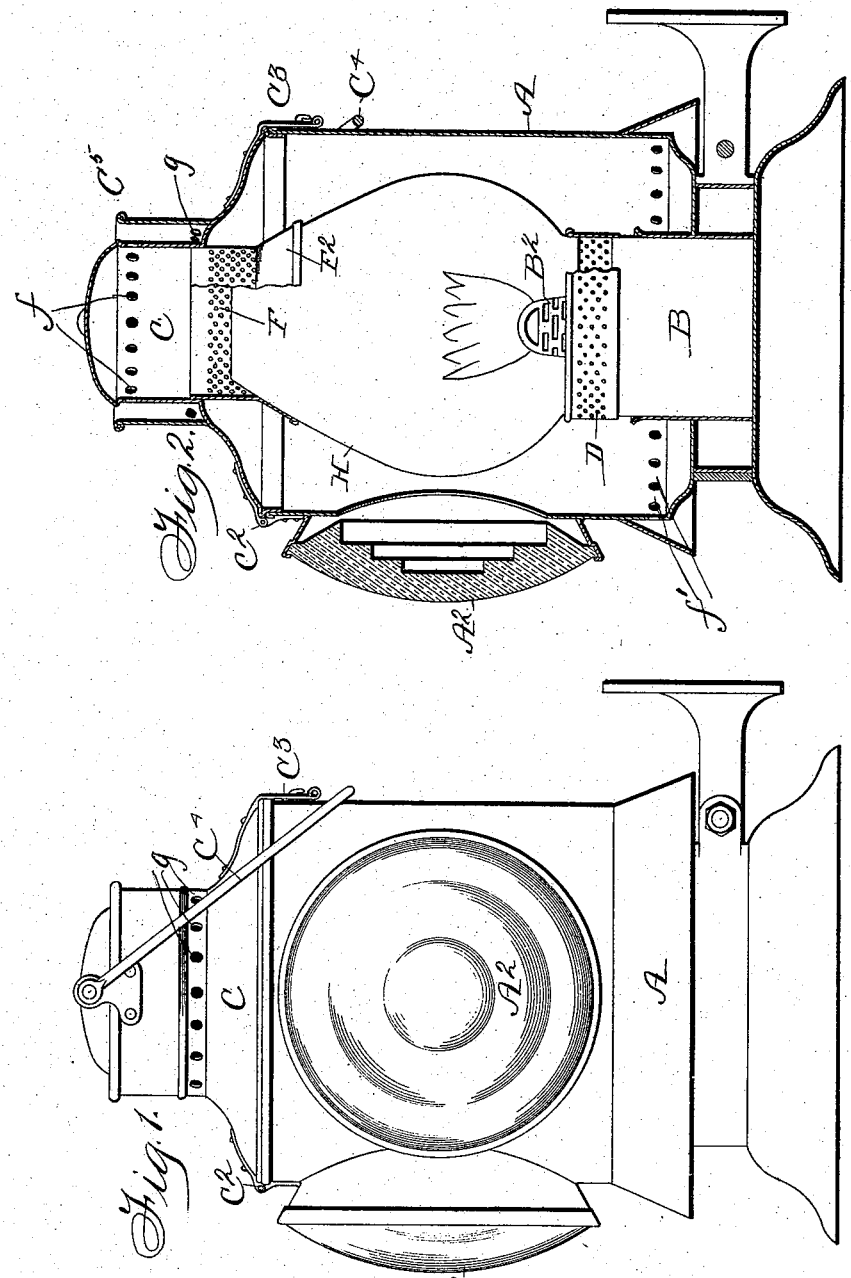

THOMAS J. WADDELL, OF DES MOINES, IOWA, ASSIGNOR OF ONE-HALF TO LAWRANCE C. O'BRIEN, OF SAME PLACE.

SIGNAL-LANTERN.

SPECIFICATION forming part of Letters Patent No. 568,820, dated October 6, 1896.

Application filed November 30, 1895. Serial No. 570,589. (No model.)

*To all whom it may concern:*

Be it known that I, THOMAS J. WADDELL, a citizen of the United States of America, residing at Des Moines, in the county of Polk and State of Iowa, have invented an Improvement in Signal-Lanterns, of which the following is a specification.

My object is to facilitate the handling of the oil-reservoir, burner, and globe as required to keep the lantern in order, to inclose them as required to heat air and admit it to the burner to promote combustion, and to admit heated air at the top of the globe to aid in producing a draft, and to control and direct the air as required to prevent smoke, flickering, or extinguishing of the flame when the lantern is swung in the air or exposed to a strong wind or gale, and I accomplish the results contemplated by the arrangement and combination of parts as hereinafter set forth, pointed out in my claims, and illustrated in the accompanying drawings, in which—

Figure 1 shows a side elevation of the complete lantern. Fig. 2 shows a vertical longitudinal section of the same.

I will first describe the construction of the ordinary signal-lamp and later my improvements, which are somewhat in the nature of an attachment for the usual signal-lamp.

The reference-letter A is used to indicate the lantern-frame, having at its front and sides the colored glasses $A^2$, a suitable base B, and a cylindrical oil-receptacle on the base having the usual wick-holding device $B^2$.

C indicates a ventilated top hinged to the body portion at $C^2$ and provided with a spring-catch $C^3$, and $C^4$ is a bail pivoted to the lantern-body.

$C^5$ is a collar fixed to the hinged top C in concentric position, with the top portion thereof having perforations $f$ to produce an open-topped annular chamber and to serve as a shield to prevent wind passing inward through said perforations $f$ in the upper portion of the wall of the hinged top C. Perforations $g$ at the lower portion of the collar $C^5$ admit air to enter the annular chamber and to create an upward draft that aids in promoting combustion and preventing smoke.

It has been found in lanterns of this class that the large and irregular space in the interior, necessary on account of the three protruding glasses, permits the flame to burn irregularly and flicker and therefore become easily extinguished. I have obviated these objectionable features by providing the following devices.

D indicates a perforated collar fixed to the top of the cylindrical oil-receptacle and projected a considerable distance above it, and on the hinged cover I have fixed a perforated collar F or auxiliary chimney having its lower edges inclined outwardly at $F^2$ and shaped to readily admit the top of a lamp-chimney. An air-chamber is thus produced around the lamp-chimney from which heated air passes upward.

H indicates a glass lamp-chimney having its lower end so shaped as to enter the collar D and be supported thereby, at the same time having a sufficient space between the lower end of the chimney and the oil-chamber to admit a sufficient quantity of air to produce perfect combustion.

In the practical use of my invention the oil cup or reservoir B and burner $B^2$, combined therewith, are readily placed in the open-topped chamber, fixed in a concentric position to the base of the case or frame A. The perforated collar D admits and supports and retains the chimney or globe H in a concentric position with the case or frame A, and the hinged cover carrying the auxiliary chimney or perforated collar F, having an outwardly-flaring lower end or flange $F^2$, provides access to the globe, oil-reservoir, and burner, and when dropped into a closed position the flange $F^2$ engages the top of the globe and fastens it in its place. The air admitted at the bottom of the chamber through perforations $f'$ in the lower part of the case or frame A, surrounding the globe, is heated by radiation from the globe and a portion enters the lower part of the globe through the perforated collar D, and the remainder enters the top C through the perforated collar F and escapes through the perforations $f$ around the top portion of the part C. The air thus heated and directed into and through the globe and to the burner and from the top of the globe to the outside of the lantern is divided into a multiplicity of minute currents as it enters and as it escapes and moves in converging lines relative to the burner to aid combustion and to prevent smoking and flickering and extinguishing while the lantern is in use, as contemplated for signaling by swinging the lantern or giving light during a storm.

Having thus described my invention, what I claim as new therein, and desire to secure by Letters Patent of the United States therefor, is—

1. In a signal-lantern, a frame or case having fixed glasses to radiate light, a base having an open-topped chamber in its center to admit an oil-reservoir, perforations to admit air to enter the lower portion of the case, a hinged top having an annular chamber that admits air, a perforated collar at the bottom of the inside wall of said chamber provided with a flaring flange at its lower end to engage a glass chimney, an oil-reservoir having a perforated collar at its top adapted to support a glass globe or chimney, a burner on the top of the oil-reservoir, and a glass globe or chimney, arranged and combined as and for the purposes stated.

2. An improved signal-lantern comprising a frame or case having fixed glasses to radiate light, a base having an open-topped chamber in its center to admit an oil-reservoir, perforations to admit air to enter the lower portion of the case, a hinged top having a perforated upper portion, a perforated collar connected with said upper portion provided with a flaring flange at its lower end to engage a glass chimney, an oil-reservoir having a perforated collar at its top adapted to support a glass globe or chimney, and a fixed perforated collar in concentric position with the central and perforated upper portion of the hinged top, arranged and combined as and for the purposes stated.

THOMAS J. WADDELL.

Witnesses:
L. C. O'BRIEN,
THOMAS G. ORWIG.